Patented July 20, 1954

2,684,323

UNITED STATES PATENT OFFICE 2,684,323

PROCAINE ASCORBATE PREPARATION

Simon L. Ruskin, New York, N. Y., assignor to Physiological Chemicals Company, New Rochelle, N. Y., a corporation of New York No Drawing. Application October 21, 1950,
Serial No. 191,483

4 Claims. (Cl. 167—81)

The present invention relates to the preparation of an improved form of the anaesthetic compound procaine and more particularly to the preparation of procaine ascorbate.

The present application is a continuation-in-part of my co-pending application Ser. No. 528,612, filed March 29, 1944, now Patent No. 2,606,903, which is in turn a continuation-in-part of my earlier application Serial No. 457,598 filed September 7, 1942, now Patent No. 2,419,230.

Procaine is a well known local anaesthetic and is employed in medicine in the form of a salt, usually with an inorganic acid, the hydrochloride being the salt most commonly employed. The use of the known procaine salts has, however, been attended with serious disadvantages. Quite frequently, edema sets in after the anaesthetic has worn off. As commonly employed in the form of the hydrochloride, and also as the nitrate, it is quite strongly acid in reaction and consequently causes tissue irritation. Procaine is also known to produce convulsions of varying degrees of intensity.

It is the general object of the present invention to provide a combined form of procaine, in which the disadvantages mentioned are overcome. More particularly, it is an object of the invention to provide a salt of procaine, which in addition to being free of the irritating and disturbing effects encountered with the use of the known procaine salts, is non-toxic and possesses a healing action which has not been encountered with the procaine salts heretofore employed. Other objects and advantages of the invention will appear from the more detailed description hereinafter.

In accordance with the present invention, I provide the procaine in the form of its ascorbic acid (vitamin C) salt. I have found that procaine ascorbate can be employed for local anaesthesia and can be used intravenously for the control of muscular spastic states, neuralgia, allergic reactions, control of traumatic pains and the like. The salt is normally neutral in reaction in aqueous solution and is accordingly substantially free from tissue irritation.

The favorable therapeutic response of procaine ascorbate is apparently due to the fact that it provides a high concentration of the ascorbate radical within the surgical area, so that wound healing is promoted and a firmer union of the surgical areas of the wound results. This is apparently due to the fact that the salt promotes collagen formation. The high level of vitamin C radical which the salt provides directly in the surgical area cannot be matched by oral administration of vitamin C because the latter is diluted by all the body fluids and is also in large part destroyed by intestinal bacteria such as coli, and of the fraction which is absorbed, only a relatively small amount reaches any particular part of the body.

I have found further, that procaine ascorbate is a self-detoxifying preparation in that the convulsant properties of the procaine are neutralized by the ascorbyl radical, so that the toxicity of procaine is practically entirely absent in its ascorbic acid salt.

Procaine ascorbate can be injected intramuscularly in areas to be treated surgically; because it is substantially neutral it can be injected intravenously in the treatment of arthritis and traumatic injury. It is also useful intravenously for cardia arrhythmias and simultaneously corrects disturbances in heart rhythm, while the ascorbic radical acts to improve heart muscle function.

Procaine ascorbate can be marketed in the form of the solid salt to be mixed with sterilized water prior to use, or in the form of a ¼% to 2% aqueous solution. If desired, mixtures of a known procaine salt such as the hydrochloride, nitrate or borate, and an ascorbate of anon-toxic metal, preferably an alkali or alkaline earth metal, like sodium, potassium and magnesium, can be provided in dry, ampouled form to be mixed with the proper amount of water prior to use. Or procaine base in equimolecular amount with ascorbic acid may similarly be put up in ampoule form, in the dry condition.

The following examples illustrate satisfactory ways of preparing procaine ascorbate by way of illustration and are not to be understood as indicating the scope of the invention.

Example 1

4.27 g. of ascorbic acid in 1000 cc. of water are stirred with 5.73 g. of procaine base. The procaine goes into solution as procaine ascorbate. The solution is filtered and ampouled in convenient amounts, for example 5 cc. of the 1% solution. To the solution there can be added $\frac{1}{10}$% of sodium bisulphite or of sodium borate as a stabilizer. The solution can also be stabilized with 5% dextrose.

For intravenous use, 30 to 50 mg. of the salt in 500 to 1,000 cc. of isotonic aqueous dextrose or saline solution can be administered by slow drip.

Example 2

Equimolecular proportions of procaine base and ascorbic acid in more or less powdered form are mixed intimately together and charged into ampoules. Upon the addition of sterile water to the mixture by the physician just prior to use, a fresh, substantially neutral solution of procaine ascorbate is obtained.

Example 3

23.6 g. ($\frac{1}{10}$ mol) procaine base and 17.6 g. ($\frac{1}{10}$ mol) ascorbic acid were warmed with about 200 cc. absolute methyl alcohol until solution was complete. The resulting solution was then slowly treated under stirring and cooling with 500 cc. chloroform or acetone. A yellow precipitate was obtained, which hardened on standing overnight in the ice chest. Yield 40 g. or almost quantitative.

The salt procaine ascorbate can be obtained also by evaporation of the solution obtained according to Examples 1 and 2. The salt can also be prepared by double decomposition, between, for example, procaine hydrochloride and a combining proportion of sodium ascorbate. The simultaneously produced sodium chloride is unobjectionable and therefore need not be removed from the solution or from the solid product obtained on evaporation. This is illustrated by the following example:

Example 4

To an approximately saturated aqueous solution of procaine hydrochloride containing 27.3 g. of the salt, there is added a concentrated aqueous solution of sodium ascorbate containing 20 g. of such salt. The resulting mixture is concentrated and the precipitated procaine ascorbate is collected, washed and dried. If desired, the whole reaction mixture can be evaporated to dryness since the sodium chloride that is present therein is generally unobjectionable. The dried procaine ascorbate, with or without sodium chloride, can then be packaged in the dry condition, or the reaction solution itself can be ampouled, or a solution of the separated procaine ascorbate.

The dry solid procaine ascorbate can also be marketed in the form of a suspension in an injectable vegetable oil, like peanut and sesame oils. Thus, 100 mg. can be suspended in 1 cc. of a peanut oil and beeswax mixture wherein the beeswax has the usual proportion to the peanut oil, such as 1:4. The suspension is only slowly absorbed and produces a longer lasting effect than the aqueous solution.

I claim:

1. Procaine ascorbate.
2. A dry, solid preparation consisting essentially of unreacted procaine base and ascorbic acid in equivalent proportions and adapted, on the addition of water, to form procaine ascorbate.
3. A dry, solid preparation consisting essentially of an inorganic acid salt of procaine and a substantially equimolecular proportion of a non-toxic metal salt of ascorbic acid.
4. A dry mixture of procaine hydrochloride, and a salt of ascorbic acid selected from the group consisting of alkali and alkaline earth metal salts in equivalent proportions.

References Cited in the file of this patent

UNITED STATES PATENTS

| Number | Name | Date |
|---|---|---|
| 2,187,467 | Stuart | Jan. 16, 1940 |
| 2,259,492 | Ruskin | Oct. 21, 1941 |
| 2,294,937 | Ruskin | Sept. 8, 1942 |

OTHER REFERENCES

Stanistreet, Australian Journal of Pharmacy, Sept. 30, 1946, pages 730 to 733.

Ser. No. 373,612, Kok (A. P. C.), published May 11, 1943.